(12) United States Patent
Liu

(10) Patent No.: US 8,037,352 B2
(45) Date of Patent: Oct. 11, 2011

(54) METHOD FOR AUTO POWER RESTORATION

(75) Inventor: Chi-Chuan Liu, Shing Tien (TW)

(73) Assignee: Moxa Inc., Shing Tien, Taipei Hsien (TW)

( * ) Notice: Subject to any disclaimer, the term of this patent is extended or adjusted under 35 U.S.C. 154(b) by 325 days.

(21) Appl. No.: 12/345,601

(22) Filed: Dec. 29, 2008

(65) Prior Publication Data

US 2010/0169689 A1    Jul. 1, 2010

(51) Int. Cl.
*G06F 11/00*    (2006.01)
(52) U.S. Cl. .............................. 714/22; 714/48; 713/340
(58) Field of Classification Search ................ 714/4, 22, 714/48; 713/340
See application file for complete search history.

(56) References Cited

U.S. PATENT DOCUMENTS

| | | | |
|---|---|---|---|
| 7,203,849 B2 * | 4/2007 | Dove | 713/300 |
| 7,243,251 B2 * | 7/2007 | Atias et al. | 713/324 |
| 7,418,613 B2 * | 8/2008 | Hirai | 713/340 |
| 2008/0040625 A1 * | 2/2008 | Vorenkamp et al. | 713/340 |
| 2008/0244297 A1 * | 10/2008 | Fenwick | 713/340 |
| 2010/0083022 A1 * | 4/2010 | Diab | 713/340 |

* cited by examiner

*Primary Examiner* — Yolanda L Wilson
(74) *Attorney, Agent, or Firm* — Muncy, Geissler, Olds, & Lowe, PLLC

(57) ABSTRACT

The present invention relates to an auto-restore method for a powered device by using a computer device to build a detecting/responding packet in an Ethernet exchanger, and the Ethernet exchange can mutually transmit the packet with the powered device. If the Ethernet exchanger fails to receive a responding packet from the powered device in the predetermined time and the predetermined value, the Ethernet exchanger will terminate power supply by the Ethernet and reset the powered device, and the powered device will be restored automatically accordingly. If the powered device still cannot function normally after few times of reset, the Ethernet exchanger will shutdown the power supplied by the Ethernet and transmits an alarm signal to the computer device. Thus not only the consumption of the system and safety risk are reduced, but also promptly maintained, to increase the reliability, and save the supervision time of the operator and the cost of onsite maintenance. Besides, the prompt maintenance can also reduce the possible damage occurred during the breakdown of the powered device.

8 Claims, 4 Drawing Sheets

PoE Setting

PoE System Setting
    PoE Power Budget    Auto ☑ 10   Watt
        Disconnect Approach   Deny next Port ☐
  Port Setting

| Port Number | Enable | Priority | Power Limit | PD Failure Check |
|---|---|---|---|---|
| 1 | ☑ Enable | High ☐ | Manual ☐ 10 Watt | ☑ Enable IP ☐ Periods 10 Sec |
| 2 | ☑ Enable | High ☐ | Manual ☐ 10 Watt | ☑ Enable IP ☐ Periods 10 Sec |
| 3 | ☑ Enable | High ☐ | Manual ☐ 10 Watt | ☑ Enable IP ☐ Periods 10 Sec |
| 4 | ☑ Enable | High ☐ | Manual ☐ 10 Watt | ☑ Enable IP ☐ Periods 10 Sec |

*FIG. 4*

METHOD FOR AUTO POWER RESTORATION

BACKGROUND OF THE INVENTION

1. Field of the Invention

The present invention relates to a method for auto power restoration. More particularly to a method using an Ethernet exchanger and a powered device to mutually transmit a packet for quickly notifying whether the powered device operates normally, and automatic repair when the powered device is out of order, thus reducing consumption of the system and risking safety, as well as promptly maintain, increase the reliability, and save supervision time of the operator and reduce the cost of onsite maintenance.

2. Description of Related Art

Computers are popularly used everywhere due to the rapidly developed computer technology and internet. The features of the internet enable the user to search a variety of information over the internet in daily life for learning, work and entertainment. In such condition, the communication between people is usually conducted by mutually sending messages on the internet. The communication bridge between the computer and the outer network majorly is the component of the Ethernet, for example RJ45. However, the wired Ethernet device takes the external independent power to supply to a powered device, for example, computer, internet phone, wireless base station, webcam or hub; such method restricts the power position to the above devices, and it is unable to operate when there is lack of power supply. A solution to this defect is to use the power over Ethernet (POE) the 802.3af standard set by IEEE, this technology needs no change in the original structure of the Ethernet cable, only need loading an Ethernet power supply chip in the Ethernet device to smoothly separate a part of the power from the Ethernet to fill into the vacancy for power supply.

Therefore, in the usual situation, an Ethernet exchanger with the Ethernet power supplying function can continue to supply power to the powered device. When an error occurs to the powered device, for example, crash or hardware damage, to disable the device, if the Ethernet exchanger is still supplying the power, the minor result would lead to losing the system efficiency and the severe result would cause a short circuit to induce danger to the public security.

The present available solution is that the manager should personally discover problems occurred to the powered device and manually stops the power supply via the webpage. But this method can not notify the manager of the unusual status on time, and the reaction time is delayed when the problem is personally discovered. The system manager receives the powered device disabling message on time not only consuming the system resources of the corporation, but also endangering operators' safety. On the other hand, an alternative to the solution is to build hardware circuit detecting device in the Ethernet exchanger, for example, an AC disconnect or the DC disconnect. When the hardware circuit detects the current required from the powered device lowering to a certain predetermined level, the power supply will be disconnected at a predetermined time. Although the technique has the active power disconnection function, but the manager still has to be notified for executing repair work. Besides, the time for checking and handling will be more if the manager can not find out whether the software or the hardware damage occurred in the powered device.

The passive solution is insufficient. When the powered device can not receive power supply, the powered device will not be able to react to the situation if the manager is unable to find out the problem on time. It can cause other possible severe damage like burglary during time of mal-function of the webcam if such situation occurs in the webcam of the bank or the manufacturing plant.

The above described method to view webpage by using the explorer indeed have defects, therefore, how to solve the above defects has become the important issue for the suppliers in the field.

SUMMARY OF THE INVENTION

An object of the present invention is to provide a method for auto power restoration.

According to an aspect of the present invention, the computer setup a detecting/responding packet protocol in an Ethernet exchanger. The Ethernet exchanger and a powered device are used to mutually transmit a packet, and when the Ethernet exchanger does not receive a responding packet from the powered device at a predetermined value and at a predetermined time, the powered device is reactivated by resupplying power after disconnection. Thus, failure software in the powered device may be automatically restored. However, when the operation still can not function normally after a plurality of reactivations of the powered device, the Ethernet exchanger will stop supplying power to the powered device in order to reduce the damage to the system and the risk to the safety due to the Ethernet exchanger continuous supply power when the powered device breakdown. Besides, reactivation of the powered device can promptly restore, increase reliability of the system, save the time of supervision and reduce the cost of onsite maintenance. Nevertheless, such prompt maintenance method can also reduce the possible damage occurred during the failure time of the powered device.

According to another aspect of the present invention, the powered device determines breakdown when the Ethernet exchanger judges that no responding packet is received from the powered device at the predetermined time for few times, and the powered device is reactivated. Thus, effectively reduce the chance of misjudgment caused by the loss of the test packet during the network transmission.

According to another aspect of the present invention, when the Ethernet exchanger judges the powered device has breakdown and reactivates it, the Ethernet exchanger will start to mutually transmit the packet with the powered device after a predetermined time. If the powered device is still being judged to be mal-functioning after few reactivations, the Ethernet exchanger not only stops to continue supplying power to the powered device, but also transmits an alarm signal to the computer device in order to notify the manager. Thus, the manager can be notified of the breakdown of the powered device on time to reduce the time and cost of the manager's supervision and the maintenance requirement can be notified to the manager on time.

BRIEF DESCRIPTION OF THE DRAWINGS

For a more complete understanding of the present invention, reference will now be made to the following detailed description of preferred embodiments taken in conjunction with the following accompanying drawings.

FIG. 4 is an aspect of an operation display of an auto restoration method of a powered device according to another embodiment of the present invention.

DETAILED DESCRIPTION OF THE INVENTION

Figure 1:
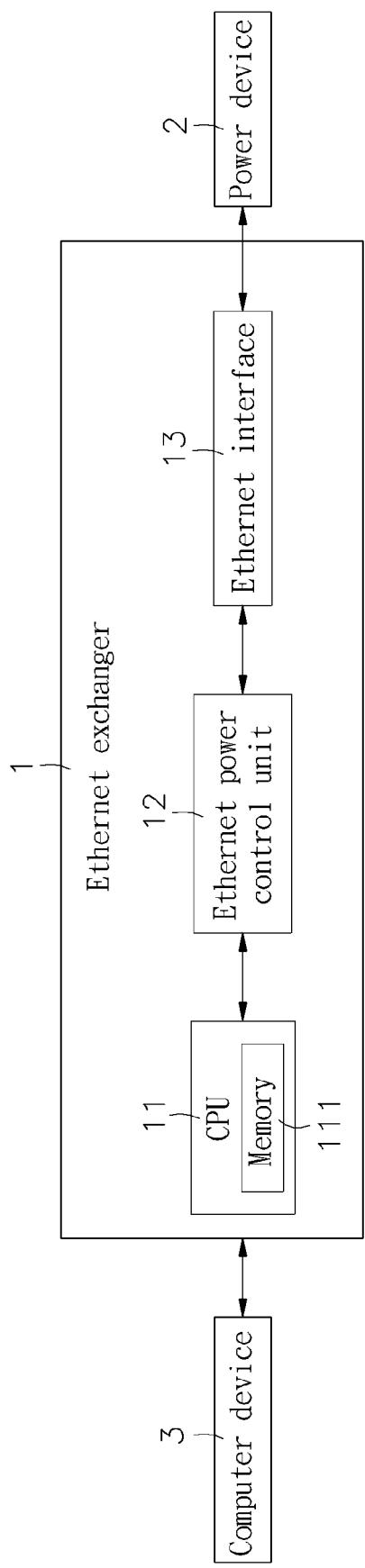
FIG. 1 is a block diagram of an auto restoration method of a powered device according to an embodiment of the present invention.

FIG. 1 is a block diagram of an auto restoration method of a powered device according to an embodiment of the present invention, the embodiment of the present invention comprises of an Ethernet exchanger 1, a powered device 2 and a computer device 3.

The Ethernet exchanger 1 comprises a CPU 11 comprising a memory 111 and the CPU 11 is connected to an Ethernet power control unit 12. The Ethernet power control unit 12 is further connected to an Ethernet interface 13. The Ethernet interface 13 may be a RJ45 or other Ethernet connection component, and the Ethernet interface 13 can be more than one.

The powered device 2 is connected to the Ethernet interface 13 of the Ethernet exchanger 1 through an Ethernet cable. The powered device 2 can be a notebook computer, an industrial computer, a desktop computer, a server, an internet phone, a base station, a webcam or a hub, and the powered device 2 can be more than one.

The computer device 3 and the CPU 11 of the Ethernet exchanger 1 are connected, and the computer device 3 can be a notebook computer, an industrial computer, a desktop computer or a server.

Figure 2:
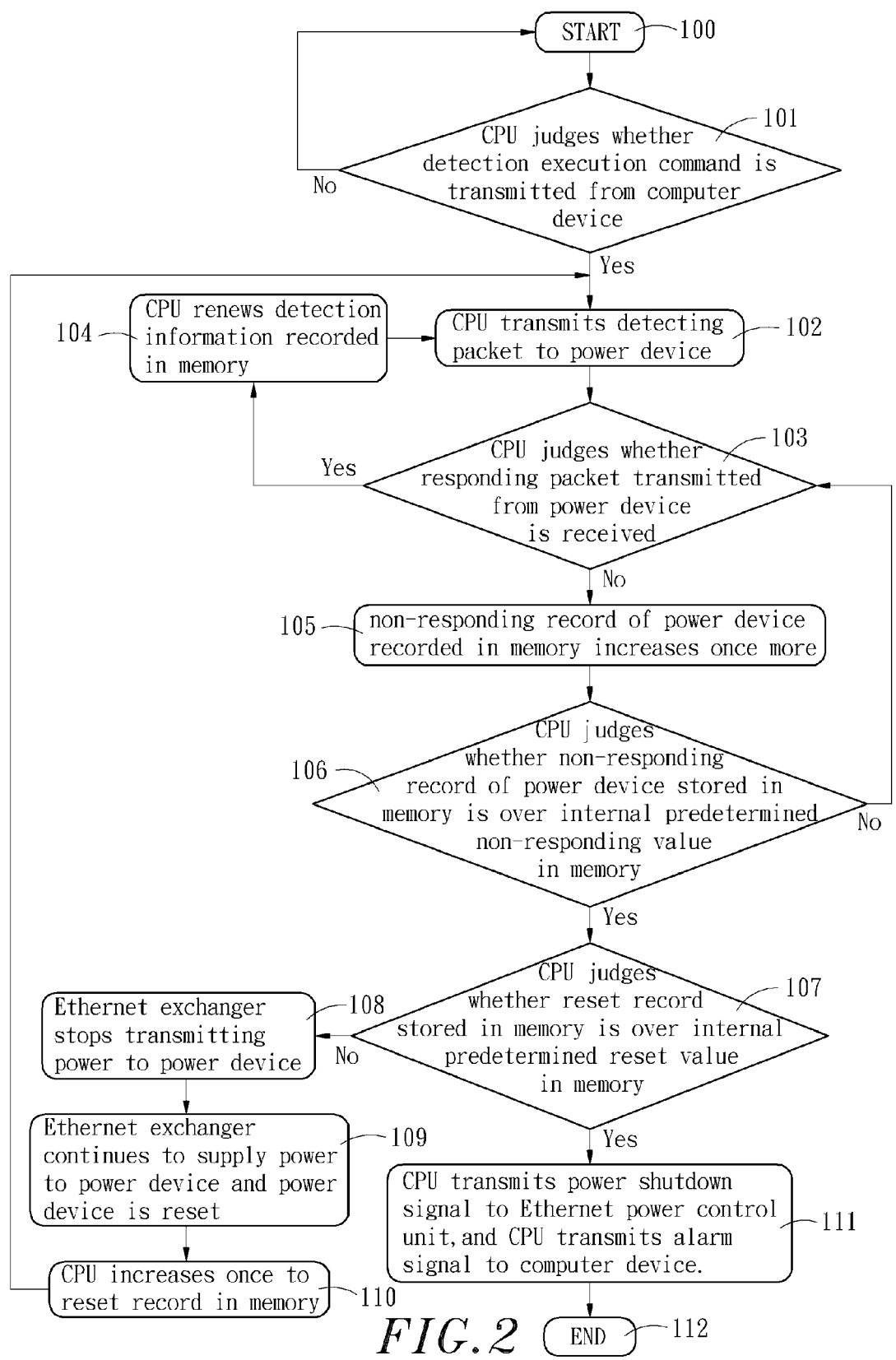
FIG. 2 is a flowchart of an auto restoration method of a powered device according to an embodiment of the present invention.
Figure 3:
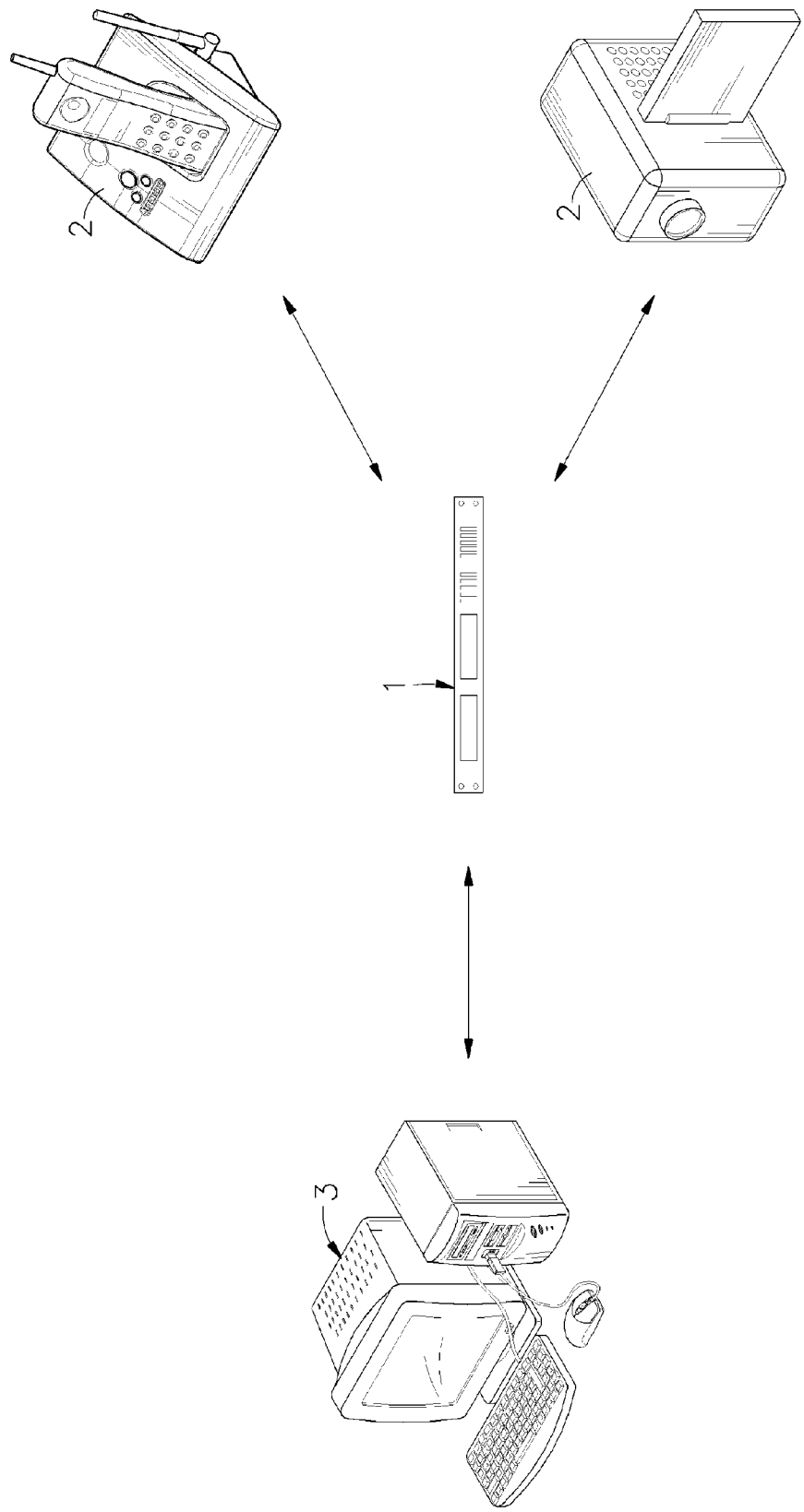
FIG. 3 is an aspect of an auto restoration method of a powered device according to a preferred embodiment of the present invention.

Referring to FIGS. 1, 2, and 3, when the Ethernet exchanger 1 is activated, the manager can select whether to initiate the execution status function of the detecting and repair the external powered device 2, and the detection method of the Ethernet exchanger 1 includes the a detecting/responding packet protocol which is built by computer device 3, and the detection/response packet protocol is, for example, the packet internet groper (ping), this ping has the detection method of response mechanism. Under the normal operation, when the Ethernet exchanger 1 transmits a detecting packet to the powered device 2, the powered device 2 will respond this packet to the Ethernet exchanger 1 after receiving, and the procedure may be described as follows.

At step 100, the procedure is started.

At step 101, the CPU 11 of the Ethernet exchanger 1 judges whether a detection execution command is transmitted from the computer device 3, wherein if it is judged that the detection execution command is not transmitted from the computer device 3, the procedure returns to step 100, otherwise, the procedure proceeds to step 102.

At step 102, the CPU 11 transmits a detecting packet to the powered device 2 through the Ethernet interface 13.

At step 103, the CPU 11 judges at a predetermined time whether a responding packet transmitted from the powered device 2 is received through the Ethernet interface 13, wherein if it is judged that the responding packet transmitted from the powered device 2 is received, the procedure proceeds to step 104, otherwise, the procedure proceeds to step 105.

At step 104, the CPU 11 renews detection information recorded in the memory 111, and the procedure proceeds to step 102.

At step 105, the non-responding record of the powered device 2 recorded in the memory 111 increases once more.

At step 106, the CPU 11 judges whether the non-responding record of the powered device 2 stored in the memory 111 is over an internal predetermined non-responding value in the memory 111, wherein if it is judged that the non-responding record of the powered device 2 stored in the memory 111 is not over the internal predetermined non-responding value in the memory 111, the procedure returns to step 102, otherwise, the procedure proceeds to step 107.

At step 107, the CPU 11 judges whether a reset record is stored in the memory 111 is over the internal predetermined reset value in the memory 111, wherein if it is judged that the responding record stored in the memory 111 is not over the internal predetermined reset value in the memory 111, the procedure proceeds to step 108, otherwise, the procedure proceeds to step 111.

At step 108, the CPU 11 transmits a power shutdown signal to the Ethernet power control unit 12, the Ethernet power control unit 12 disconnects the power supplied by the Ethernet, and the Ethernet exchanger 1 stops transmitting power to the powered device 2 to further shutdown the powered device 2.

At step 109, the CPU 11 transmits the power activation signal again to the Ethernet power control unit 12 after a predetermined time, and the Ethernet exchanger 1 continues to supply power to the powered device 2 and the powered device 2 is reset.

At step 110, the CPU 11 increases one reset record in the memory 111, and the procedure returns to step 102.

At step 111, the CPU 11 transmits a power shutdown signal to the Ethernet power control unit 12, the Ethernet power control unit 12 disconnects the power supplied by the Ethernet, and the CPU 11 transmits an alarm signal to the computer device 3.

At step 112, the procedure is ended.

The predetermined time in the above steps 103, 107 and 109 can be setup by the manager, the time setup value is not intended to limit the scope of the present invention; in step 104, the CPU 11 renews the detection information recorded in the memory 111, and the detection information comprises the non-responding record and the reset record of the powered device 2.

The predetermined non-responding and reset value in the memory 111 also can be setup by the designer, if the designer setup the number of the predetermined non-responding and reset value are both 3 times, and when the CPU 11 repeatedly transmits out three times of the detecting packet without receiving the responding packet from the powered device 2 in the predetermined time, the CPU 11 will transmit a signal for shutting down the power supply function of the Ethernet to the Ethernet power control unit 12, and reset the power supply function after a period of time for restarting the powered device 2; after a period of time, the CPU 11 re-judges whether the reset times recorded in the memory 111 is over three times. In other word, after the Ethernet exchanger 1 is activated to execute the detection, if the reset record is less than three times, the Ethernet exchanger 1 will stop transmitting power to the powered device 2, and re-transmitting power to the powered device 2 after a predetermined time. If the powered device 2 restores normal after reset, the problem will be determined a software error. If reset process is executed over three times after a period of time, and the CPU 11 fails to receive the responding packet from the powered device 2 after a predetermined time, the CPU 11 will judge that the powered device 2 cannot be automatically restored. At the same time, the Ethernet exchanger 1 will stop supplying power to the powered device 2. Besides, when the CPU 11 judges the auto-restoration cannot be executed, the CPU 11 will send an alarm signal to the computer device 3 by Email, the SNMP Trap or the activate message in order to notify the manager to go the site for maintenance.

Referring to FIG. 4, the computer device 3 comprises a graphic operation interface to control the Ethernet exchanger 1. There is the plurality of Ethernet interfaces 13 in the embodiment, the manager can setup the related information, for example, selection of activating the functions of detecting and repairing the execution status of the external powered device 2, the internet protocol of the powered device 2 or the time record of repeating the detection, and these related information can be added up according to the designer's need. These examples are only for demonstrating the embodiment of the present invention, and is not intended for limiting the scope of the present invention, any modification and variations would be construed to fall within the spirit and scope of the present invention. Furthermore, the description of the embodiment is merely for demonstrating the preferred embodiment of the present invention, and is not intended for limiting the scope of the present invention; therefore, the settings of the predetermined time, the predetermined non-responding value, the predetermined reset value, the alarm method and the quantity of the Ethernet interface 13 are changeable according to the manager's need. The main feature of the present invention is that the Ethernet exchanger 1 can monitor whether the powered device 2 is functioning normally; and when the malfunction occurs, the powered device 2 may automatically restore or stop the power supply. Therefore, any modification and variations would be construed to be within the spirit and scope of the present invention.

The auto-restoring method of the powered device in the present invention has at least the following advantages compared to the conventional art.

1. The present invention uses the Ethernet exchanger 1 to transmit a detecting packet to the external powered device 2, and the Ethernet exchanger 1 judges whether the powered device 2 transmits a responding packet in order to detect whether the powered device 2 is operating normally. If the Ethernet exchanger 1 judges that the powered device 2 is mal-functioning, the power supply to the powered device 2 will be terminated to prevent possible system damage occurred due to continued power supply to the breakdown the powered device 2, as well as to prevent the danger to the operators, thus increase the system reliability and reduce the supervision time of the operator and the cost.

2. The present invention uses the Ethernet exchanger 1 to reset the powered device 2 when the powered device 2 breaks down; when the cause of breaking down of the powered device 2 is the software, the powered device 2 can be reset to restore the operation, thus the powered device 2 can be automatically restored without notifying the manager; the Ethernet exchanger 1 can be used to reset the powered device 2 and reduce the cost of having the onsite maintenance technician.

3. The powered device 2 is judged to breakdown after the Ethernet exchanger 1 of the present invention judges that the powered device 2 doesn't transmit a responding packet in the predetermined time for few times, the restoration process will be proceeded, and after few times of the judgment from the Ethernet exchanger 1, the decision of reset the powered device 2 will be made, thus the chance of misjudgment caused by losing the detecting packet due to the jam of the network or other possible factors may be effectively reduced.

4. The Ethernet exchanger 1 of the present invention judges whether the record of executing the restoration process is higher than the predetermined value and the powered device 2 still mal-functioned, if yes, the powered device 2 will be judged as being damaged to disable the auto-restoration, and the Ethernet exchanger 1 will terminate the power supply and transmits a signal to the computer device 3 to notify the manager that the powered device 2 is damaged and requires maintenance; thus not only the manager can receive the active notification about the powered device 2, but also reduces the supervision time for the manager as in the case of the conventional art, and notifies the manager for on time maintenance.

5. The Ethernet exchanger 1 can reset the powered device 2 to restore the normal operation of the powered device 2 on time, and if the powered device 2 is still mal-functioning after few times of reset, the Ethernet exchanger 1 will notify the manager to go to the site for maintenance, thus the error of the powered device 2 can be handled instantly to reduce the risk of the possible damage like burglary during time of mal-functioning of the webcam if such situation occurs in the webcam of the bank or the manufacturing plant.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations in which fall within the spirit and scope of the included claims. All matters set forth herein or shown in the accompanying drawings are to be interpreted in an illustrative and non-limiting sense.

The invention claimed is:

1. An auto-restore method for a powered device, comprising an Ethernet exchanger and at least one powered device; said Ethernet exchanger being connected to a computer device building a detecting/responding packet protocol in said Ethernet exchanger; said Ethernet exchanger comprising a CPU having a memory, and said CPU being connected to an Ethernet power control unit connected to said powered device through an Ethernet interface; the auto-restore method comprising:

(A) starting the auto-restore method;
(B) judging whether a detection execution command transmitted from said computer device by said CPU, wherein if it is judged that no detection execution command is transmitted from said computer device, the procedure returns to step (A); otherwise, the procedure proceeds to step (C);
(C) transmitting a detecting packet to said powered device through said Ethernet interface by using said CPU;
(D) judging whether a responding packet transmitted from said powered device through said Ethernet interface is received by using said CPU, wherein if it is judged that said responding packet transmitted from said powered device through said Ethernet interface is received, the procedure proceeds to step (E); otherwise, the procedure proceeds to step (F);
(E) renewing detection information recorded in said memory by using said CPU, and the procedure returns to step (C);
(F) increasing a non-responding record of said powered device recorded in said memory;
(G) judging whether said non-responding record of said powered device stored in said memory is higher than an internal predetermined non-responding value in said memory by using said CPU, wherein if it is judged that said non-responding record of said powered device stored in said memory is lower than an internal predetermined non-responding value in said memory, the procedure proceeds to step (C), otherwise the procedure proceeds to step (H);

(H) judging whether a reset record of said powered device stored in said memory is higher than an internal predetermined reset value in said memory by using said CPU, wherein if it is judged that said responding record of said powered device stored in said memory is lower than said internal predetermined reset value in said memory, the procedure proceeds to step (I), otherwise the procedure proceeds to step (L);

(I) transmitting a power shutdown signal to said Ethernet power control unit by using said CPU, wherein said Ethernet power control unit disconnects power supplied by said Ethernet, and said Ethernet exchanger stops transmitting power to said powered device to further shutdown said powered device;

(J) transmitting a power activation signal to said Ethernet power control unit after a predetermined time by using said CPU, wherein said Ethernet exchanger continues to supply power to said powered device and said powered device will be reset;

(K) increasing a reset record in said memory by using said CPU, and the procedure proceeds to step (C);

(L) transmitting a power shutdown signal to said Ethernet power control unit by using said CPU, wherein said Ethernet power control unit disconnects power supplied by said Ethernet, and said Ethernet exchanger stops transmitting power to said powered device; and (M) ending the auto-restore method.

2. An auto-restore method for a powered device according to claim 1, wherein when said CPU judges a reset record of said powered device stored in said memory is higher than an internal predetermined reset value in said memory, and said CPU transmits an alarm signal to said computer device.

3. An auto-restore method for a powered device according to claim 2, wherein said alarm signal of CPU of said Ethernet exchanger transmitted to said computer device can be as a electronic Email, a SNMP Trap or an active message.

4. An auto-restore method for a powered device according to claim 1, wherein said powered device can be a notebook computer, an industrial computer, a desktop computer, a server, an internet phone, a base station, a webcam or a hub.

5. An auto-restore method for a powered device according to claim 1, wherein said Ethernet interface can be an Ethernet connecting component.

6. An auto-restore method for a powered device according to claim 1, wherein said computer device comprises a graphic operation interface comprising information including a selection of activating functions of detecting and repairing an execution status of said external powered device, an internet protocol of said powered device or a time record of repeating detection.

7. An auto-restore method for a powered device according to claim 1, wherein said detecting/responding packet protocol can be a packet internet groper (ping).

8. An auto-restore method for a powered device according to claim 1, wherein said detection information comprises a non-responding record and a reset record of said powered device.

* * * * *